United States Patent

Suzuki et al.

[11] Patent Number: 5,506,644
[45] Date of Patent: Apr. 9, 1996

[54] CAMERA

[75] Inventors: Tatsuya Suzuki, Funabashi; Junichi Ito, Hachioji; Kunio Yokoyama, Tokyo, all of Japan

[73] Assignee: Olympus Optical Co., Ltd., Tokyo, Japan

[21] Appl. No.: 303,148

[22] Filed: Sep. 8, 1994

Related U.S. Application Data

[63] Continuation of Ser. No. 107,218, Aug. 13, 1993, abandoned.

[30]    Foreign Application Priority Data

Aug. 18, 1992  [JP]  Japan ..................................... 4-219390
Aug. 21, 1992  [JP]  Japan ..................................... 4-223027

[51] Int. Cl.⁶ ........................... G03B 17/24; G03B 29/00
[52] U.S. Cl. ............................... 354/106; 354/76
[58] Field of Search ................... 354/105, 106, 354/109, 214, 75, 76, 475, 289.1

[56]           References Cited

U.S. PATENT DOCUMENTS

| | | | |
|---|---|---|---|
| 4,705,372 | 11/1987 | Lapeyre | 354/106 |
| 5,103,250 | 4/1992 | Arifuku et al. | 354/106 |
| 5,119,118 | 6/1992 | Harada et al. | 354/106 |
| 5,229,810 | 7/1993 | Cloutier et al. | 354/76 X |
| 5,294,950 | 3/1994 | DuVall et al. | 354/109 |
| 5,296,884 | 3/1994 | Honda et al. | 354/106 |
| 5,302,990 | 4/1994 | Satoh et al. | 354/105 |
| 5,319,401 | 6/1994 | Hicks | 354/76 |
| 5,319,403 | 6/1994 | Sakamoto et al. | 354/106 |
| 5,396,305 | 3/1995 | Egawa | 354/76 |

FOREIGN PATENT DOCUMENTS 4-70735  3/1992  Japan.
4-70724  3/1992  Japan.

Primary Examiner—Howard B. Blankenship
Assistant Examiner—Nicholas J. Tuccillo
Attorney, Agent, or Firm—Louis Weinstein

[57]           ABSTRACT

A position information recorder incorporated in a camera comprises a position measurement unit that receives position information via a GPS which is a position measurement system using satellites and that performs position measurement to calculate a position, a receiving state determination unit that determines the state of receiving the position information, a memory that stores position measurement data, and a magnetic recording unit that records data in the magnetic recording area of film. When position measurement data cannot be fetched, position measurement information stored in the memory immediately before is read out and recorded.

20 Claims, 15 Drawing Sheets

CAMERA

This is a continuation of application Ser. No. 08/107,218, filed Aug. 13, 1993, now abandoned.

BACKGROUND OF THE INVENTION

1. Field of the Invention

The present invention relates to a camera, and more particularly, a camera that uses film with a recording area in which information is recorded or a Patrone and that can record position measurement data indicating a photographic position or place name data in the recording area.

2. Description of the Related Art

In recent years, many proposals have been made for a camera using film with a recording area in which photographic information and other information are recorded on a Patrone. Various proposals have been made for a camera capable of magnetically recording photographic position information representing places of photography as the photographic information in association with frames on film. In this kind of camera, a receiving means incorporated in the camera fetches position measurement data indicating a photographic position, and the position measurement data is recorded in a magnetic recording area of film.

A camera capable of recording position information has been disclosed in Japanese Patent Laid-open No. 4-70724, wherein a global positioning system (GPS) receiver is incorporated, and position measurement data received by the GPS receiver are automatically recorded in a recording area of film in one-to-one correspondence with film screens. The GPS is a high-precision position measurement system, wherein a receiver on the Earth receives data transmitted from four satellites, and time intervals required for receiving the data are measured to calculate a three-dimensional position of a place in which the receiver resides.

A camera capable of recording position information, which has been disclosed in Japanese Patent Laid-open No. 4-70735, includes a position measurement means that is the. GPS receiver, and a place code receiving means that receives place codes sent from a resort or an event hall. When such a place code can be received, the place code data fetched by the place code receiving means is recorded in a recording area of an associated frame on film. When a place code cannot be received, the position measurement data fetched by the GPS receiver is recorded in the recording area of an associated frame on film.

The cameras capable of recording position information, which have been disclosed in the foregoing Japanese Patent Laid-open Nos. 4-70724 and 4-70735, cannot fetch position measurement data sent from the GPS or place code data sent from a place code transmitter in a place where radio waves hardly reach; such as, under the shade of an obstacle, inside a building, or in a basement, and therefore cannot record the place of photography in an associated frame.

The GPS or a position measurement system based on satellites will be described in detail.

As for the position measurement system based on satellites, the navy navigation system (NNSS), navigation system with time and ranging/global positioning system (NAVSTAR/GPS), GEOSTAR system, and Ommi TRACS are well-known.

In recent years, it has been expected that the GPS will grow into a globally-usable position measurement means. In the GPS, when radio-frequency signals are received from three satellites out of a total of 18 satellites that are put in six orbits in threes, distances from the satellites are calculated to work out a latitude and longitude on the Earth. Furthermore, when radio-frequency signals are received from four satellites, an altitude as well as a latitude and longitude can be calculated. "Sensor Technology" (page 33, Jan. 1991), a Japanese publication, carries the detailed description of the GPS.

FIG. 20 is a block diagram of a GPS receiver that receives radio-frequency signals within the GPS.

An antenna 230a receives radio waves transmitted from NAVASTAR satellites which are not shown. The antenna 230a is, for example, of the quadri-filar helix type. A radio-frequency signal received by the antenna 230a is fed to a mixer 230. A modulator 231 diffuses a local oscillational signal CK1 sent from a local oscillator 232 with a PN-code signal sent from a PN code generator 233. The diffused modulated signal is fed to the mixer 230. With the modulated signal, the radio-frequency signal is converted into an intermediate-frequency signal. The intermediate-frequency signal is then fed to a data demodulator 234. The data demodulator 234 demodulates data that are placed on an input signal and include a time instant at which a satellite transmits a signal. The demodulated data is fed to a data processing circuit 235 and a delay measuring circuit 236.

With the input of the demodulated data, the delay measuring circuit 236 outputs a timing signal to the PN code generator 233. The PN code generator 233 incessantly generates a PN code in response to a clock pulse CK2 sent from a PN-code clock generator 237. With the input of the timing signal, the PN code generator 233 sends generated PN codes to the delay measuring circuit 236. A PN code provided by the data demodulator 234 and a PN code generated by the PN code generator 233 are routed to the delay measuring circuit 236. A delay time required for a PN code to correlate with the other PN code is measured. The delay time for a PN code is measured by counting high-frequency clock pulses CK3 generated by a measurement clock generator 238. The delay measuring circuit 236 supplies the count value as delay data required for the PN codes to correlate with each other to the data processing circuit 235.

The data processing circuit 235 comprises microprocessor and is driven with a clock pulse CK4 sent from a data processing clock generator 239. Using the transmission time instant data contained in the demodulated data sent from the data demodulator 234 and the reception time instant data sent from cesium and rubidium steam atomic clocks, which are not shown, incorporated in the GPS receiver, the data processing circuit 235 calculates a distance from the satellite to the GPS receiver (camera). The data processing circuit 235 computes the distance information from satellites and the position information of the satellites contained in demodulated data, calculates position information concerning the latitude, longitude, and altitude of the camera (photographer), and then outputs the position information to a CPU 200.

OBJECTS AND SUMMARY OF THE INVENTION

A first object of the present invention is to provide a camera that can fetch position information representing a place of photography and that even when photography is performed in a place whose position information is unavailable, position information related to the place of photography can be fetched and recorded on film.

A second object of the present invention is to provide a camera that enables selection and designation of place name information representing a place of photography wherever the place is and that records the place name information in an information recording area of film.

The first camera of the present invention is a camera using film with a recording area in which information is recorded, comprising a position measurement means that receives position measurement data indicating a photographic position and performs measurement to calculate the position, a position measurement data memory means that stores the position measurement data, a determination means that determines whether the position measurement means can receive position measurement data, and a recording means that when the determination means determines that the position measurement means can receive position measurement data, records the position measurement data in the recording area of film, and that when the determination means determines that the position measurement means cannot receive position measurement data, records the immediately preceding position measurement data in the recording area.

The second camera of the present invention is a camera that uses film with a recording area In which information is recorded and can record photographic position information, comprising a position information output means for outputting the position information of the camera that are designated externally using an operation member on a camera, a position information memory means that stores the position information, and a recording means that records the data based on the position information, which is stored in response to an photographic operation performed on film, in the magnetic recording area of the film.

Other features and advantages of the present invention will be apparent from the description below.

DETAILED DESCRIPTION OF THE PREFERRED EMBODIMENTS

Embodiments of the present invention will be described in conjunction with the drawings.

A camera representing the first embodiment of the present invention is a camera using film with a magnetic recording area in which information is recorded and having a built-in position information recording unit for recording position information in the magnetic recording area.

The position information recording unit incorporated in the camera will be described briefly.

Figure 1:
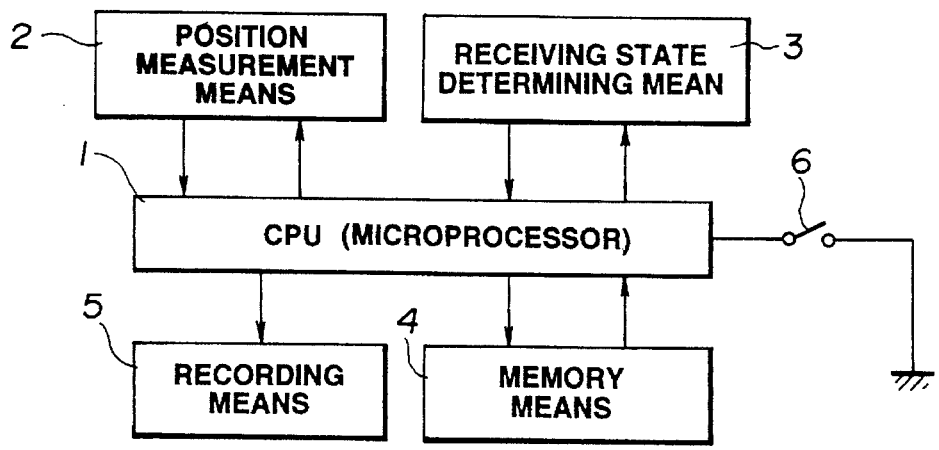
FIG. 1 is a block diagram schematically showing components of a position information recorder for a camera representing a first embodiment of the present invention.

FIG. 1 is a block diagram showing major components of a position information recorder for the camera of this embodiment. The position information recorder comprises a CPU 1 that is a microcomputer for controlling the control elements of the camera, a position measurement means 2 that performs position measurement by receiving position information provided by a system such as the aforesaid GPS, a receiving state determining means 3 that determines whether the position measurement means 2 has received position information; that is, the position measurement means 2 has completed position measurement, a memory means 4 that stores position measurement data supplied by the position measurement means 2 and that can output the stored contents to the CPU 1 for magnetic recording, and a magnetic recording means 5 for recording information in the magnetic recording area of film.

The memory means 4 is, in reality, a random access memory (RAM) or an electrically erasable programmable read only memory (EEPROM). The recording method implemented in the magnetic recording means 5 in this embodiment is a method of magnetically recording information in a magnetic track running on film. Aside from this method of using a magnetic recording means, a method using an electronic recording means for writing information in an EEPROM installed in a Patrone will do. In either method, information is recorded in association with photographed images.

Figure 2:
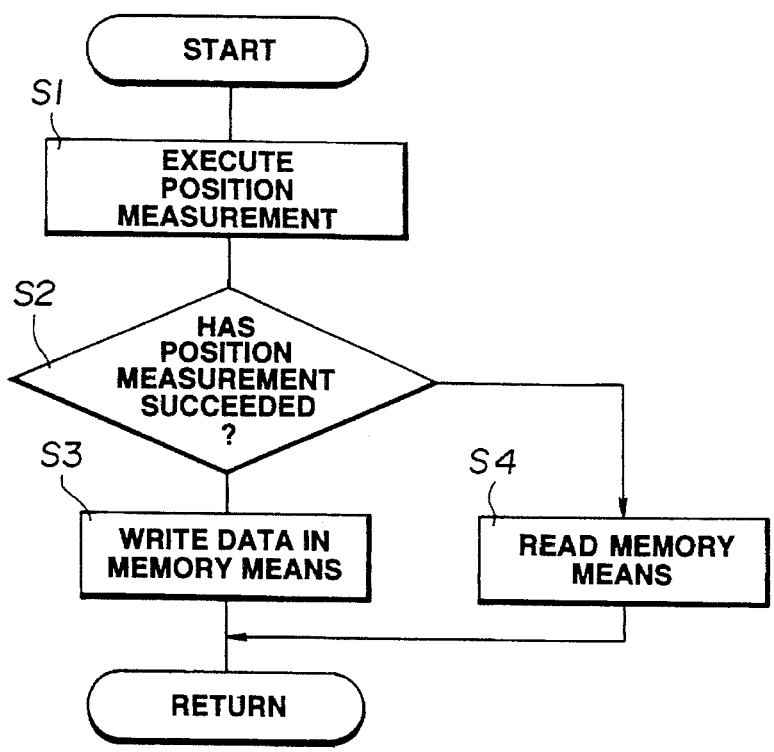
FIG. 2 is a flowchart showing position information fetching performed by the position information recorder for the camera in FIG. 1.

FIG. 2 is a flowchart of a position information fetching subroutine performed by the position information recorder for the camera of this embodiment. After release is completed, or more particularly, when a signal fed with the make of a first-release switch is input, the subroutine shown in FIG. 2 is called. Position measurement, in which the position measurement means fetches photographic position information via the GPS, is executed (step S1). Based on the output of the position measurement means 2, the receiving state determination means 3 determines whether position measurement has been completed (step S2). If position measurement has been completed, the position measurement data is written in the memory means 4 (step S3). The data is then recorded on film.

During the determination at the step S2, when the receiving state determination means 3 determines that GPS-dependent position measurement cannot be done in the current place of photography; that is, the place in which photography is attempted is indoors, between high-rise buildings, or any other place in which communication radio waves sent from the GPS are hard to catch i.e. reception is poor, control is passed to a step S4. The position measurement data stored in the memory means 4 is read out (step S4). The data is set on film, in a magnetically-recordable state. This subroutine is then terminated.

The position measurement data stored in the memory means 4 is the one written in the memory means 4 as the result of position measurement at the time of the previous photography. The position measurement data can be said to be position information representing a place close to or related to the current place of photography. Within the recording done by the position information recorder, position measurement is performed after release. When the position measurement is performed with the power switch on, if the position measurement data stored in the memory means 4 alone is read with release, a release period can be shortened.

Figure 3:
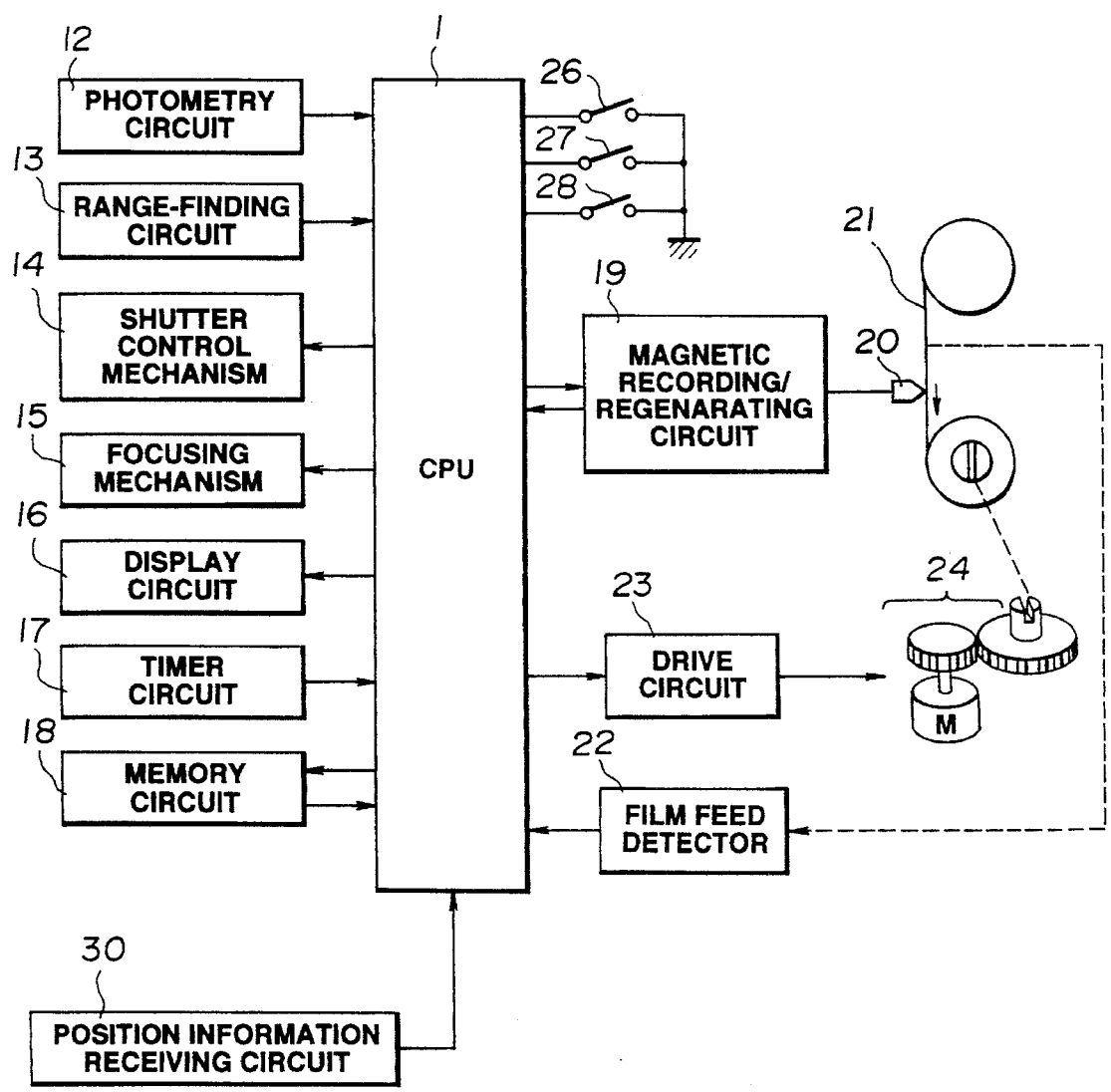
FIG. 3 is a block diagram showing major components of the camera in FIG. 1.

FIG. 3 is a block diagram showing all the components of the camera of this embodiment.

This camera comprises a CPU I (microprocessor) for controlling all the components of the camera, a photometry circuit 12, a range-finding circuit 13, a shutter control mechanism 14, a focusing mechanism 15, a display circuit 16 for displaying various information including photographic information and a date, a timer circuit 17 for producing date data, a memory circuit (EEPROM) 18 that corresponds to the memory means 4 in FIG. 1 and temporarily stores magnetic recording information, a photometry/range-finding start switch 26, an exposure start switch 27, a film rewind start switch 28, a magnetic recording/regenerating circuit 19 that corresponds to the magnetic recording means 5 in FIG. 1 and performs magnetic recording and regenerating, a magnetic head 20 that corresponds to the magnetic recording means 5 in FIG. 1 and that records data sent from the magnetic recording/regenerating circuit 19 in the magnetic recording area on film 21, reads a signal recorded in the magnetic recording area on film 21, and supplies the read signal to the magnetic recording/regenerating circuit 19, a drive circuit 23 for controlling a film feed, a feeding mechanism 24 that feeds the film 21 with a magnetic recording area according to the drive signal sent from the drive circuit 23, a film feed detector 22 for detecting a film feed of the film 21, and a position information receiving circuit 30 that corresponds to the position measurement means 2 in FIG. 1 and that receives position measurement data provided by the GPS at a photographic position. The receiving state determining means 3 (See FIG. 1) that determines the receiving state of position measurement data, which is not shown in FIG. 3, is incorporated in the camera.

Figure 4:
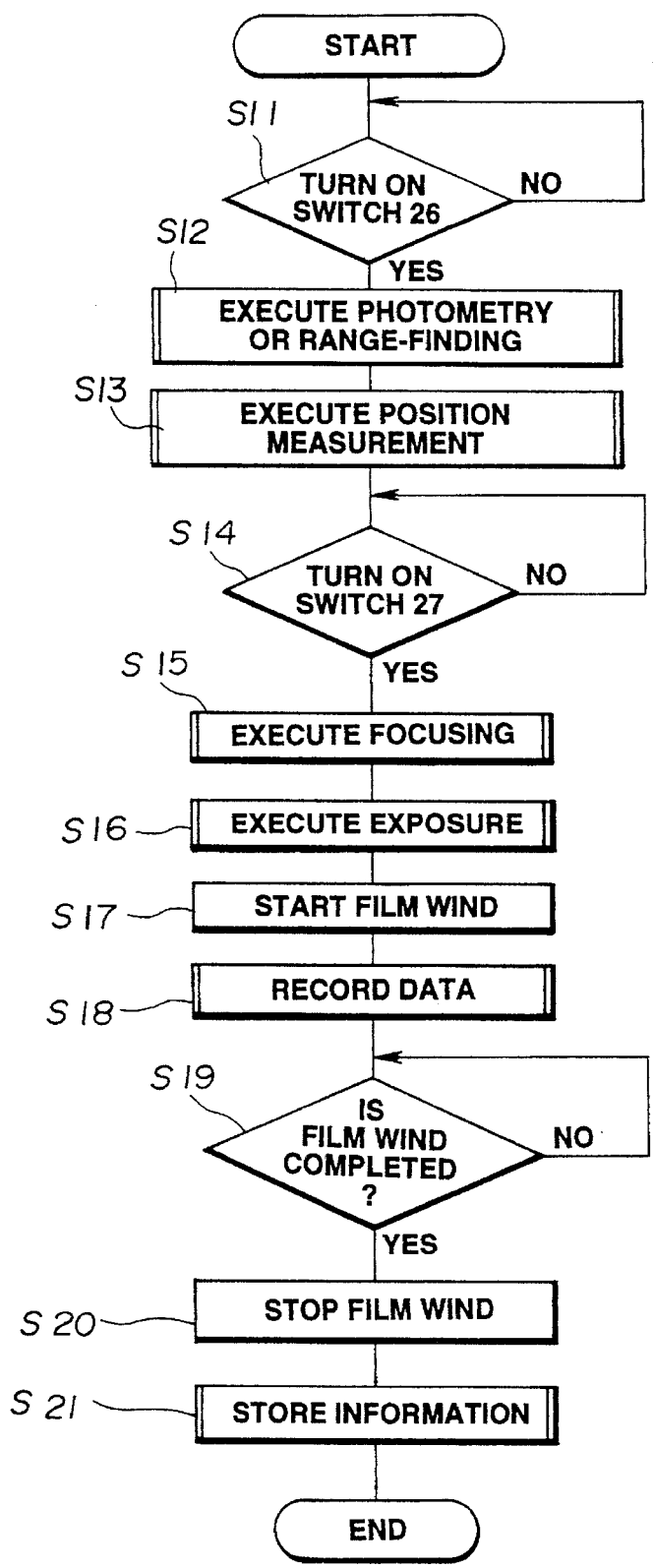
FIG. 4 is a flowchart of a photographic sequence performed by the camera in FIG. 1.

Next, a photographic sequence performed by the camera of this embodiment having the foregoing components will be described in conjunction with the flowchart of FIG. 4.

At a step S11, it is determined whether the photometry/range-finding start switch 26 is turned on. If the switch 26 is turned on, control is passed to a step S12. The photometry and range-finding subroutines are then called to execute photometry and range-finding. At a step S13, a position measurement subroutine is called.

The position measurement runs according to the flowchart of FIG. 2. That is to say, position measurement data is fetched from the GPS via the position information receiving circuit 30, if possible. If it is determined that the position measurement data cannot be fetched because of the receiving state under the photographic environment, the position measurement data stored in the memory circuit 18; that is, the position measurement data read at the time of the previous photography, is read out.

At a step S14, control is held in the wait state until the exposure start switch 27 is turned on. When the switch 27 is turned on, control is passed to a step S15. Focusing is then executed. At a step S16, exposure is executed. At a step S17, the film feeding mechanism 24 is actuated to start film wind. At a step S18, while film wind is in progress, the data to be recorded is transferred to the magnetic recording/regenerating circuit 19 for magnetic recording which will be described later in detail. At a step S19, it is checked if film wind is completed. If film wind is completed, the feeding mechanism 24 is stopped at a step S20. At a step S21, the same position measurement data as the one magnetically recorded is stored in the memory circuit 18. This photographic sequence is then terminated.

Figure 5:
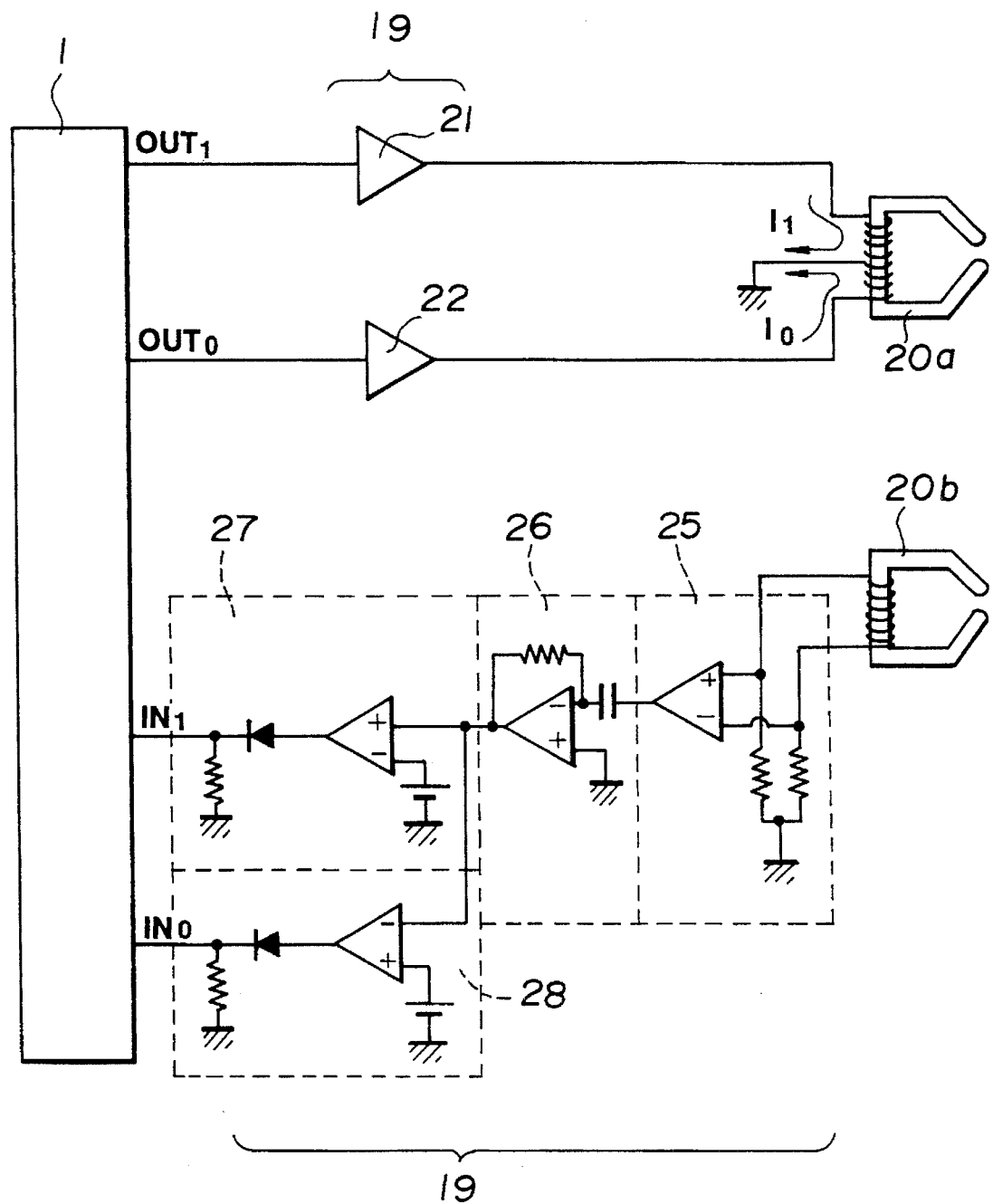
FIG. 5 is a circuit diagram of a magnetic recording/ regenerating circuit in the camera in FIG. 1.

Next, the magnetic recording and regenerating performed on the magnetic recording area of film in the camera of this embodiment will be described in conjunction with the circuit diagram of FIG. 5 showing the magnetic recording/regenerating circuit 19 and the timing chart of FIG. 6 for magnetic recording and regenerating.

In magnetic recording performed by this camera, three states; a state of north-seeking magnetization, a state of south-seeking magnetization, and a neutral state can be set in a magnetic recording medium. Assuming that the state of north-seeking magnetization is bit data 1 and the state of south-seeking magnetization is bit data 0, when the bit data 1 is to be recorded, a high-level signal is supplied to an output port OUT1 of the CPU 1 (FIG. 6a). Current I1 then flows through a coil in a recording head 20a via a buffer 21. At this time, the magnetic recording medium is magnetized toward the north magnetic pole of the earth (FIG. 6d). In contrast, when the bit data 0 is to be recorded, a high-level signal is supplied to an output port OUT0 of the CPU 1 (FIG. 6b). Current I0 then flows through the recording head 20a of a magnetic read 20 via a buffer 22. The magnetic recording medium is then magnetized toward the south magnetic pole of the earth (FIG. 6d). The advantage of this method is that since a neutral area is produced between bits, a boundary between adjoining bit data items becomes conspicuous and a synchronizing clock becomes unnecessary.

Figure 6:
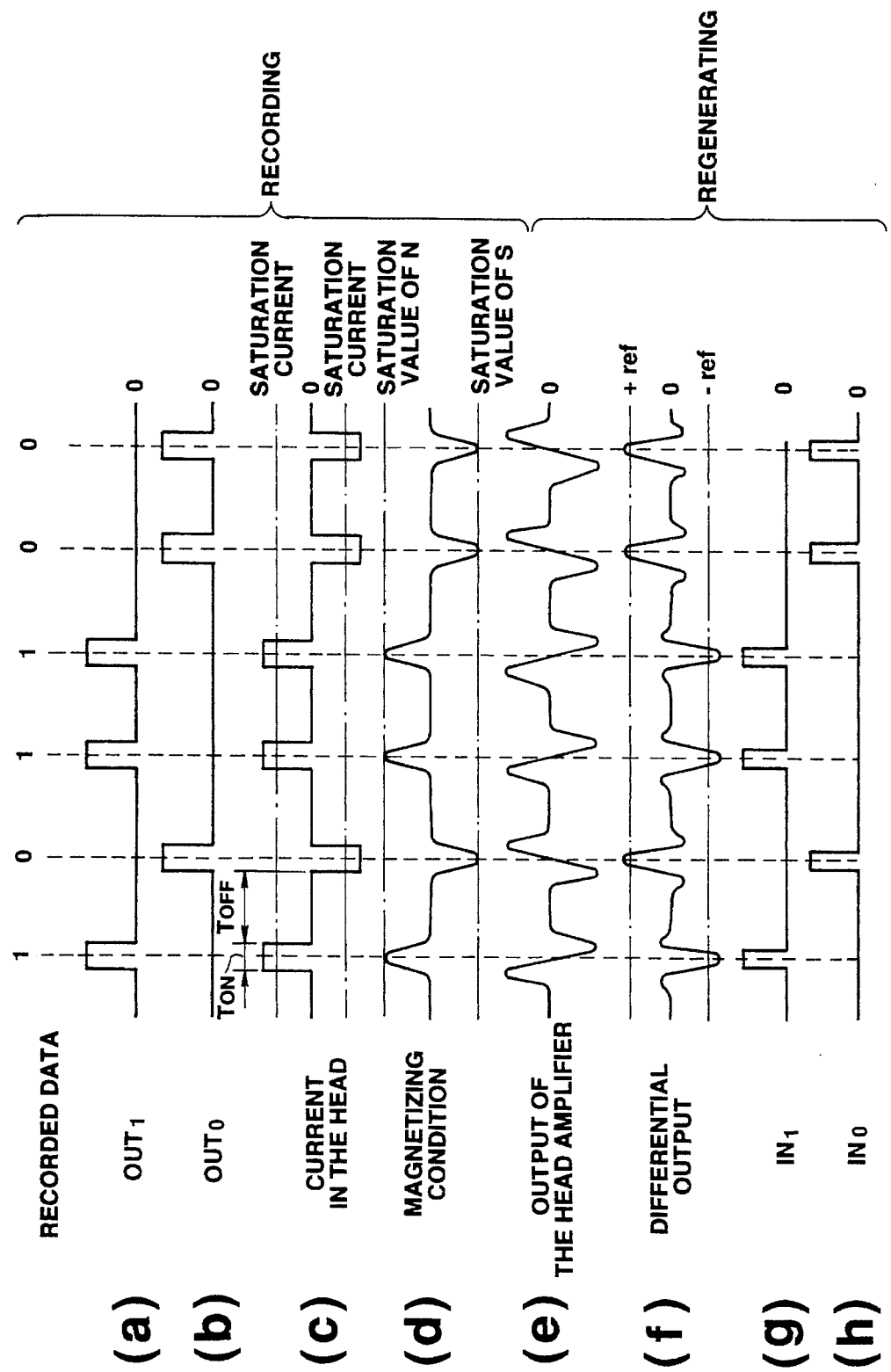
FIG. 6 is a timing chart for magnetic recording and regenerating performed by the camera in FIG. 1.

FIG. 6 is a timing chart applied when recorded data is 101100 (binary code). In FIG. 6, $T_{ON}$ denotes an on period of a recording signal and $T_{OFF}$ denotes an off period of the recording signal.

For regeneration, when a magnetized portion of a magnetic recording medium passes a regenerating head 20b of the magnetic head 20, the magnetic field in the head 20b varies to generate output voltage. The voltage is amplified by a head amplifier 25 that is a component of the magnetic recording/regenerating circuit 19 (FIG. 6e), differentiated by a differentiating circuit 26 (FIG. 6f), and then supplied to comparators 27 and 28. When the recorded data is 1, the differential output (f) assumes a negative peak value. The output of the comparator 27 is therefore reversed in polarity. A high-level signal is then fed to an input port IN1 of the CPU 1 (FIG. 6g). In contrast, when the recorded data is 0, the differential output (FIG. 6f) assumes a positive peak value. The output of the comparator 28 is then reversed in polarity. A high-level signal is then fed to an input port IN0 of the CPU 1 (FIG. 6h).

As mentioned above, in the camera of this embodiment, when photographic position data is recorded on film, position measurement data provided by a GPS is fetched. However, if the place of photography is indoors, in the shade of a building, or in a basement, where communication radio waves do not reach, position measurement data cannot be fetched. As a solution of this problem, in this embodiment, position measurement data fetched at the time of photography is stored in a memory means. Even when position measurement data cannot be fetched for the foregoing reason, the position measurement data fetched at the time of the previous photography is read as photographic position data and recorded magnetically in an associated film frame. In any circumstances, photographic position data can therefore be magnetically recorded in association with film frames.

In the aforesaid embodiment, position data is magnetically recorded after each photography for one frame is completed. In a camera that can be proposed as a variant, position data associated with frames are stored in a memory circuit, and, when film rewind is executed because photography has been completed for the whole of film, the position data are magnetically recorded in association with the film frames.

In the camera of the aforesaid embodiment, photographic position data is magnetically recorded on film. In a camera that can be proposed as a variant, the magnetic recording means is not used but a memory circuit such as an EEPROM is installed in a Patrone. An electronic storage procedure for storing the photographic position data is implemented in the memory circuit.

Figure 7:
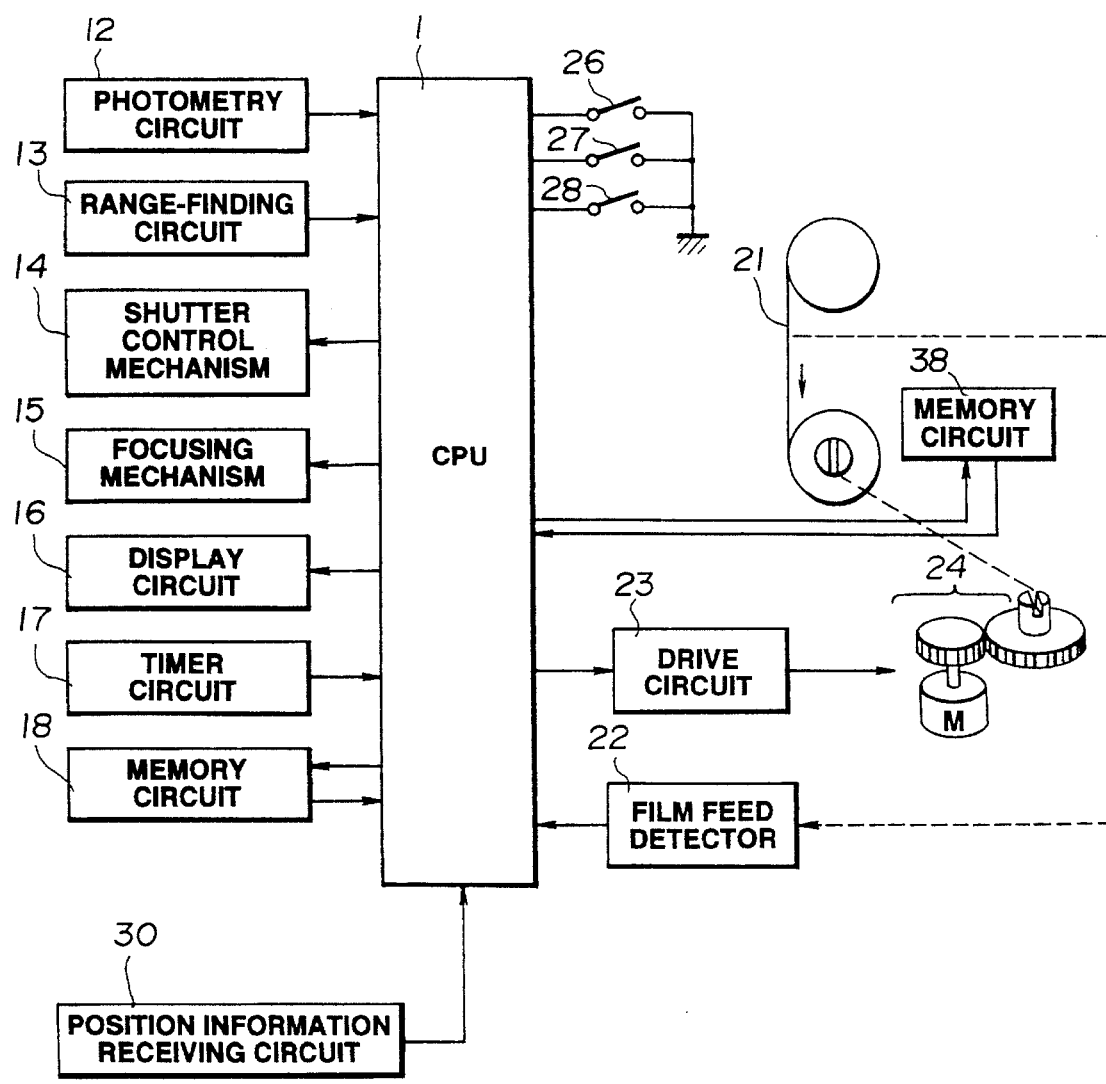
FIG. 7 is a block diagram showing a camera representing a variant of the camera of the first embodiment.

FIG. 7 is a block diagram showing the camera of the variant. In this variant, the EEPROM 18 (See FIG. 3), which is incorporated in a camera to temporarily store recording information such as photographic position data, becomes unnecessary. The magnetic recording/regenerating circuit 19 for magnetically recording and regenerating the recording information in the magnetic recording area of film is also unnecessary. In their place, a memory circuit 38 is installed in a Patrone. In the memory circuit 38, position information fetched at the times of photography are stored in association with film frames.

The other control elements in the camera of this variant are identical to those in the first embodiment. The control elements in FIG. 7 bear the same reference numerals as those in FIG. 3.

Next, a camera representing the second embodiment of the present invention will be described.

The camera of this embodiment is a camera with a built-in place name information recorder that enables selection of place name data related to a place of photography in a manner described later and records the selected data in the recording area of an associated frame on film.

Figure 8:
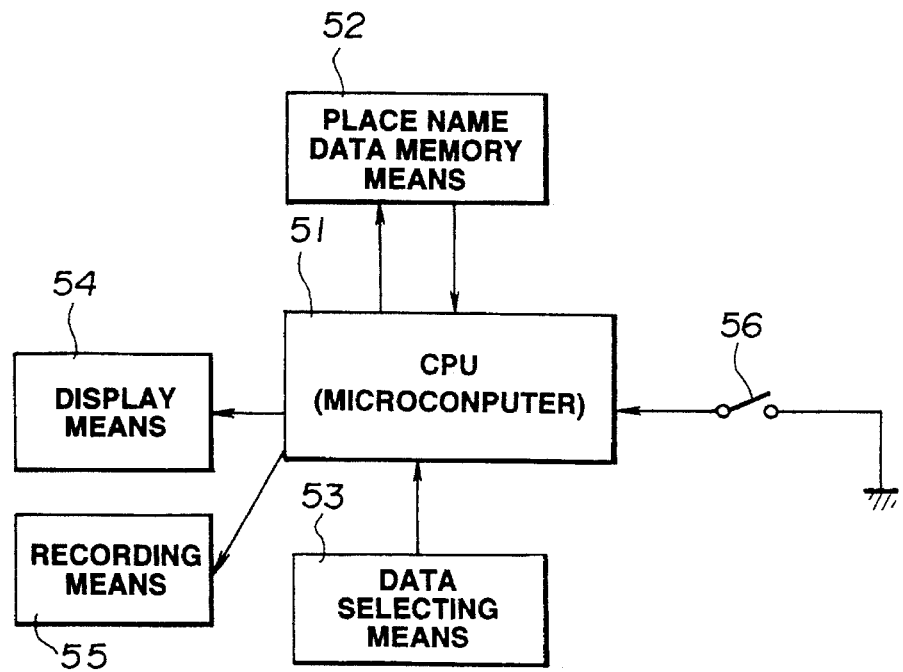
FIG. 8 is a block diagram schematically showing components of a place-name information recorder incorporated in a camera representing the second embodiment of the present invention.

FIG. 8 is a block diagram of a place-name information recorder incorporated in the camera. This recorder comprises a CPU 51 for controlling the control elements of the camera, a place-name data memory means 52 in which place names and codes associated with the place-names are electronically or magnetically stored as a hierarchical data table, a data selecting means 53 for use in selecting any of the data in the memory means 52 under the control of the CPU 51, a display means 54 for allowing a user to recognize place-name data he/she has selected or is about to select, and a recording means 55 that, when a release switch 56 is pressed, records the place-name data selected using the selecting means 3 in the magnetic recording area of film. The magnetic recording area of film is formed with a recording medium created by coating the back of a photosensitive surface of film with a magnetic substance.

Figure 9:
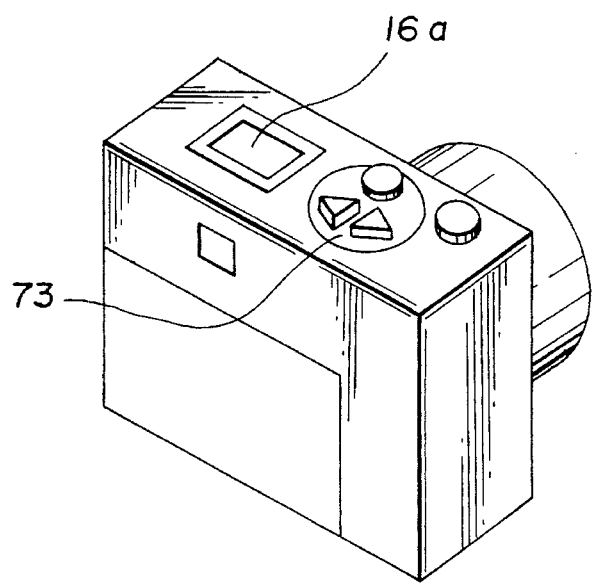
FIG. 9 is an oblique view showing the outline of the camera in FIG. 8.

FIG. 9 shows an example of a camera of this embodiment, wherein the data selecting means 53 and display means 54 are arranged in a camera body. A selector button serving as the data selecting means 53 and an LCD 16a serving as the display section of the display means 4 are arranged on the top of the camera body.

Figure 10:
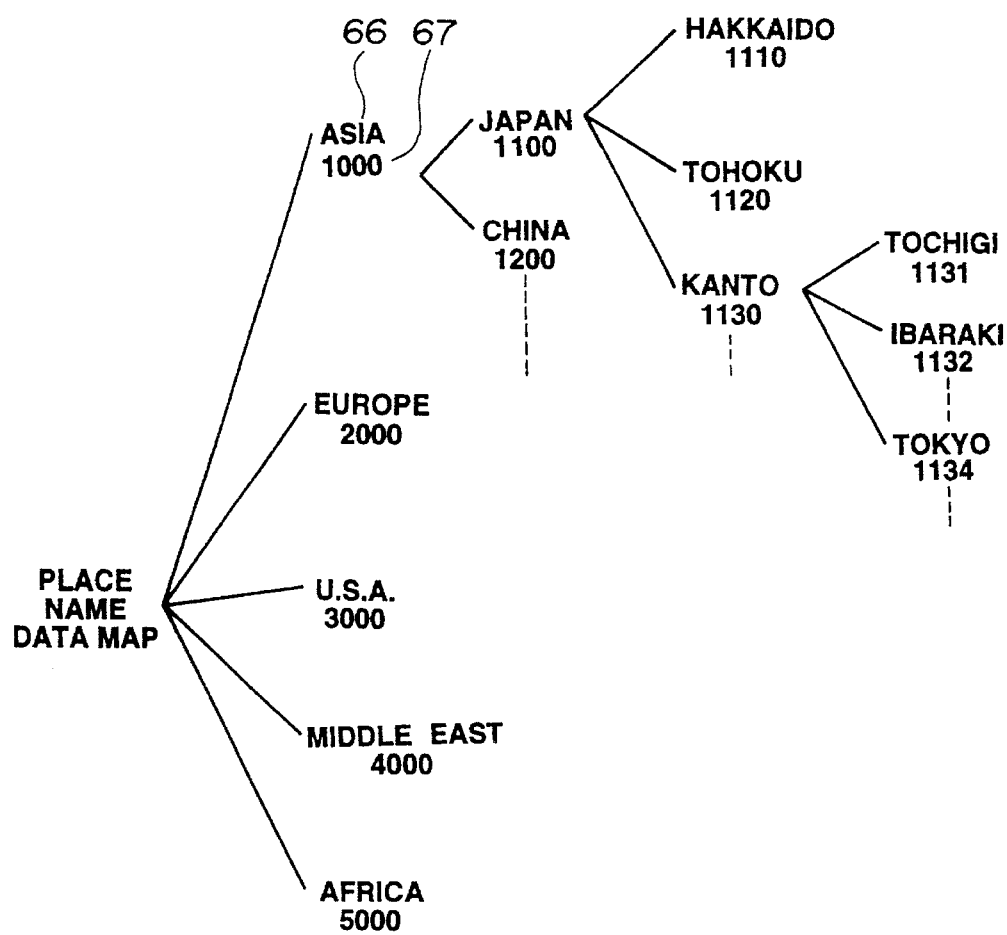
FIG. 10 shows a tree structure of place-name data in the camera in FIG. 8.

FIG. 10 shows a tree structure of place-name data stored in the place-name data memory means 2. Place-name code data 67, which are recording data, are shown in association with displayed place-names 66. These data are stored in the place-name data memory means 52 in the form of a hierarchical structure for easier selection of a place name. Specifically, nation names are registered as subordinates to continent names that are of the highest level. For a nation name of Japan, district names and prefecture names subordinate to Japan are stored in the form of a hierarchical structure.

Figure 11:
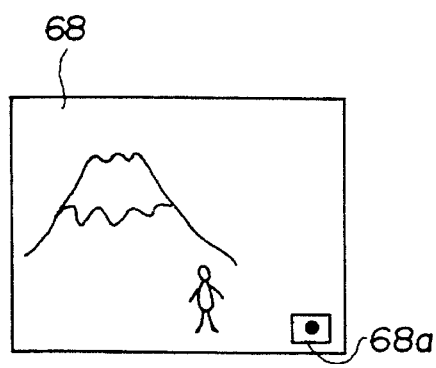
FIG. 11 shows an example of a print of film photographed by the camera in FIG. 8 on which place-name data is superimposed in the national flag mode.
Figure 12:
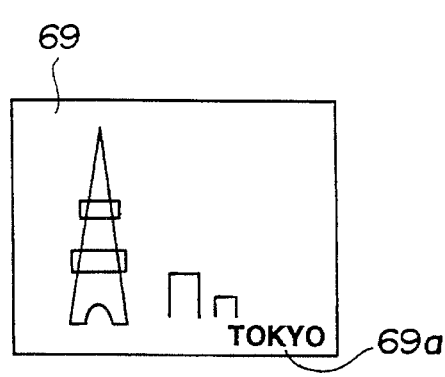
FIG. 12 shows an example of a print of film photographed by the camera in FIG. 8 on which place-name data is superimposed in the form of a district name.

FIGS. 11 and 12 show examples of prints of film photographed by the camera of this embodiment, wherein places of photography are superimposed on the prints using the place-name data. FIG. 11 shows an example of a print 68 of a frame for which a place-name code 11XX shown in FIG. 10 is recorded on film and a national flag mode or a mode in which national flags of nations are used for superimposition is specified. A national flag 68a of Japan is superimposed on the print to indicate Japan associated with the code 11XX. FIG. 12 shows an example of a print of a frame for which a place-name code 1134 is recorded on film and a place name mode or a mode in which place-names are used for superimposition is specified. A place-name "Tokyo" 69a is superimposed.

Figure 13:
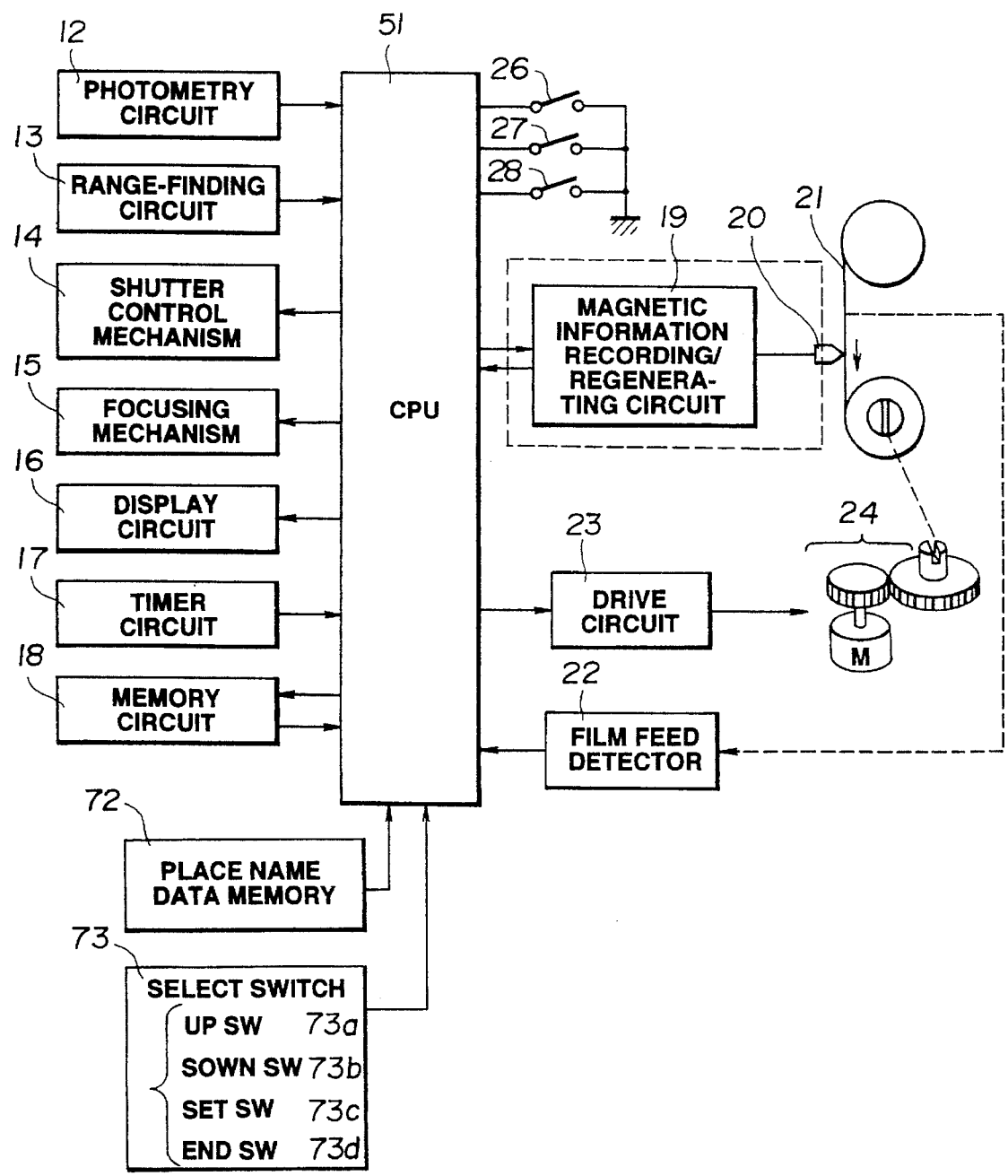
FIG. 13 is a block diagram showing all the major components of the camera in FIG. 8.

FIG. 13 is a block diagram showing all the components of the camera of this embodiment.

The camera comprises a CPU 51 for controlling all the components of the camera shown in FIG. 8, control elements starting with the photometry circuit 12 and ending with the film feeding mechanism 24 in FIG. 3, which are employed for the camera of the first embodiment, a place-name data memory 72 that corresponds to the place-name data memory means 52 in FIG. 8 and stores a place-name data map, and a select switch 73 that corresponds to the data selecting means 53 in FIG. 8 and is used to designate any of place-names in the place-name data memory 72.

The select switch 73 is pressed to designate any of place-names in the place-name data memory 72, comprising an UP switch 73a for ascending the hierarchy of place-name data or enabling addressing toward the higher hierarchical level, a DOWN switch 73b for enabling addressing toward the lower hierarchical level, a SET switch 73c for designating an address, and an END switch 73d for specifying termination of designation. These switch buttons are arranged on the top of the camera body as shown in FIG. 9.

Figure 14:
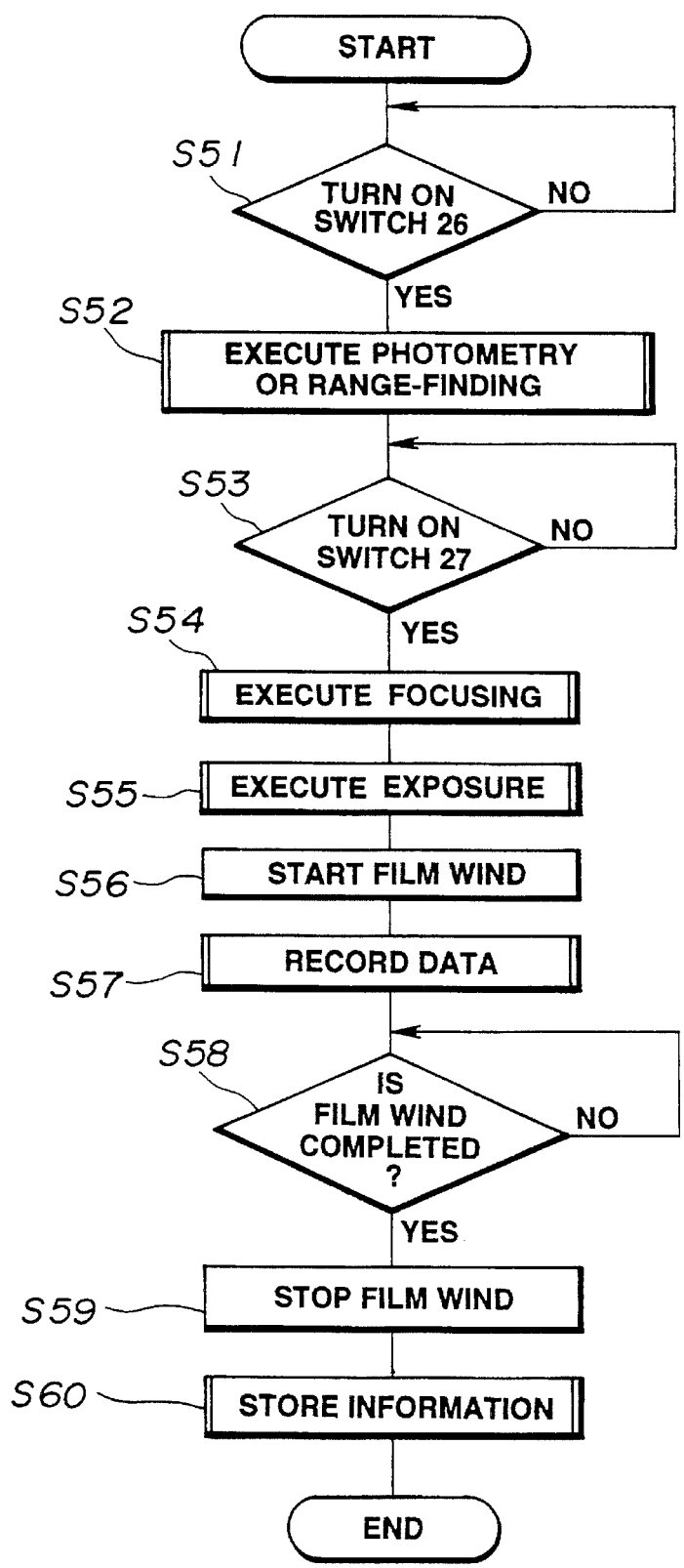
FIG. 14 is a flowchart of a photographic sequence performed by the camera in FIG. 8.

Next, a photographic sequence performed by the camera of this embodiment having the aforesaid components will be described in conjunction with the flowchart of FIG. 14. Prior to the photographic sequence, Input Place-Name shown in FIG. 15, which will be described later, is executed to fetch a place-name code into the memory circuit 18.

At a step S51, it is determined whether the photometry/range-finding start switch 26 is turned on. If the photometry/range-finding start switch 26 is turned on, control is passed to a step S52. The photometry and range-finding subroutines are run to execute photometry and range-finding. At a step S53, control is held in the wait state until the exposure start switch 27 is turned on. When the switch 27 is turned on, control is passed to a step S54. Focusing is then executed. At a step S55, exposure is executed. At a step S56, the film feeding mechanism 24 is actuated to start film wind. At a step S57, while film wind is in progress, data to be recorded in the magnetic recording/regenerating circuit 19 is transferred for magnetic recording, which will be described later in detail. At a step S58, it is determined whether film wind is completed. If film wind is completed, the film feeding mechanism 24 is stopped at a step S59. At a step S60, the same place-name code data as the aforesaid magnetically-recorded data is stored. This photographic sequence is then terminated.

Magnetic recording and regenerating for recording and regenerating place-name code data or recording data in the magnetic recording area, which is performed in the camera of this embodiment, is identical to the one described in conjunction with FIGS. 5 and 6. The description will therefore be omitted.

Next, Input Place-Name, in which after a place-name is selected using the select switch 73 on the camera, the selected place-name is registered in the place-name data memory 72, will be described in conjunction with the flowchart of FIG. 15. This processing is executed prior to the photographic sequence in FIG. 14.

Figure 15:
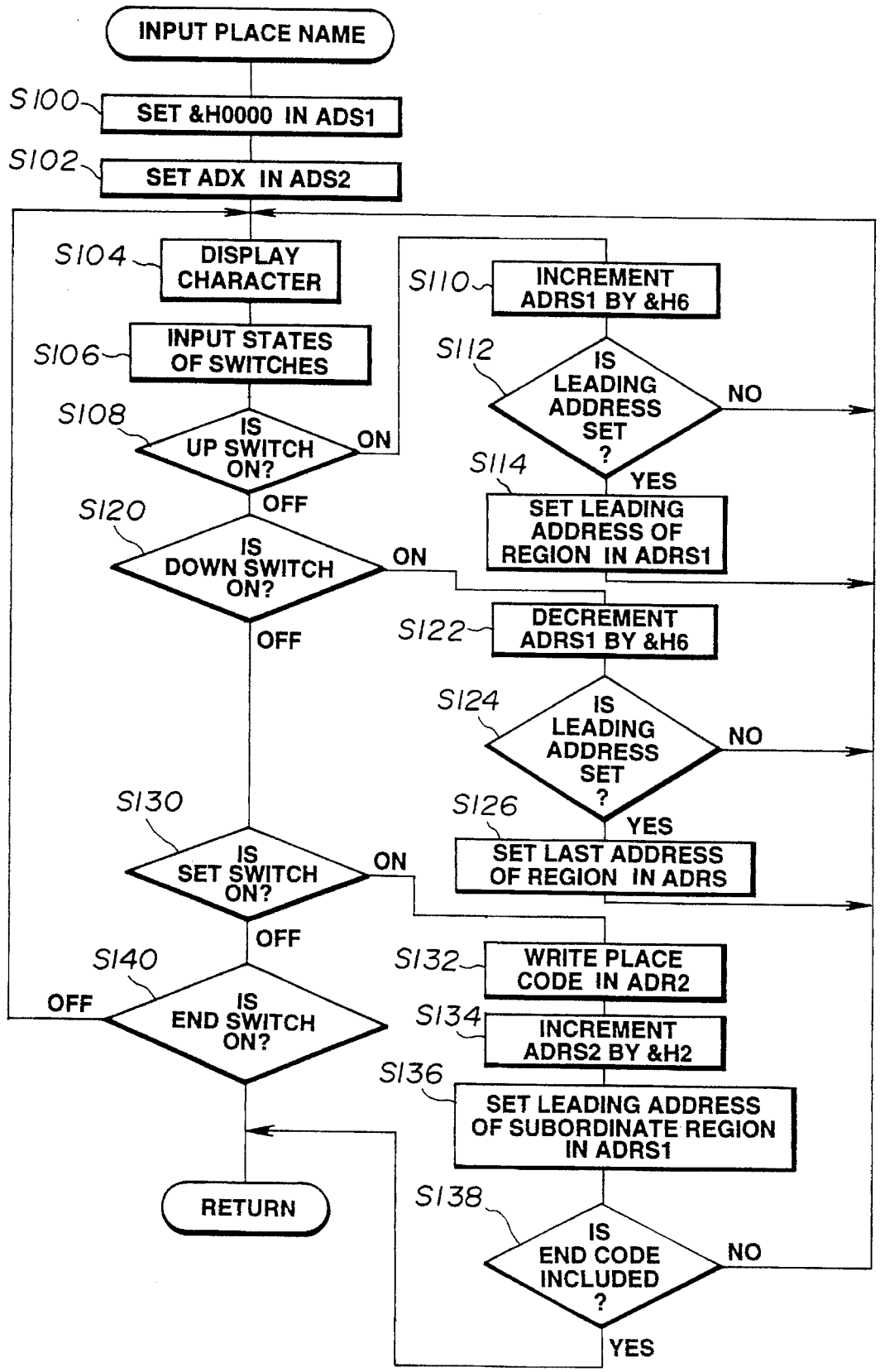
FIG. 15 is a flowchart of Input Place-Name Input performed by the camera in FIG. 8.

In Place-Name in FIG. 15, specified data is fetched from the memory 72 in which place-name data are stored, and place-name code data to be recorded in the magnetic recording area of film is written in the memory circuit 18. Selection and selected data storage are achieved by pressing the aforesaid four operation switches constituting the select switch; that is, the UP switch 73a, DOWN switch 73b, SET switch 73c, and END switch 73d.

Prior to the flowchart of FIG. 15, the structure and the memory map of place-name data in the place-name data memory 72 will be described.

Figure 16:
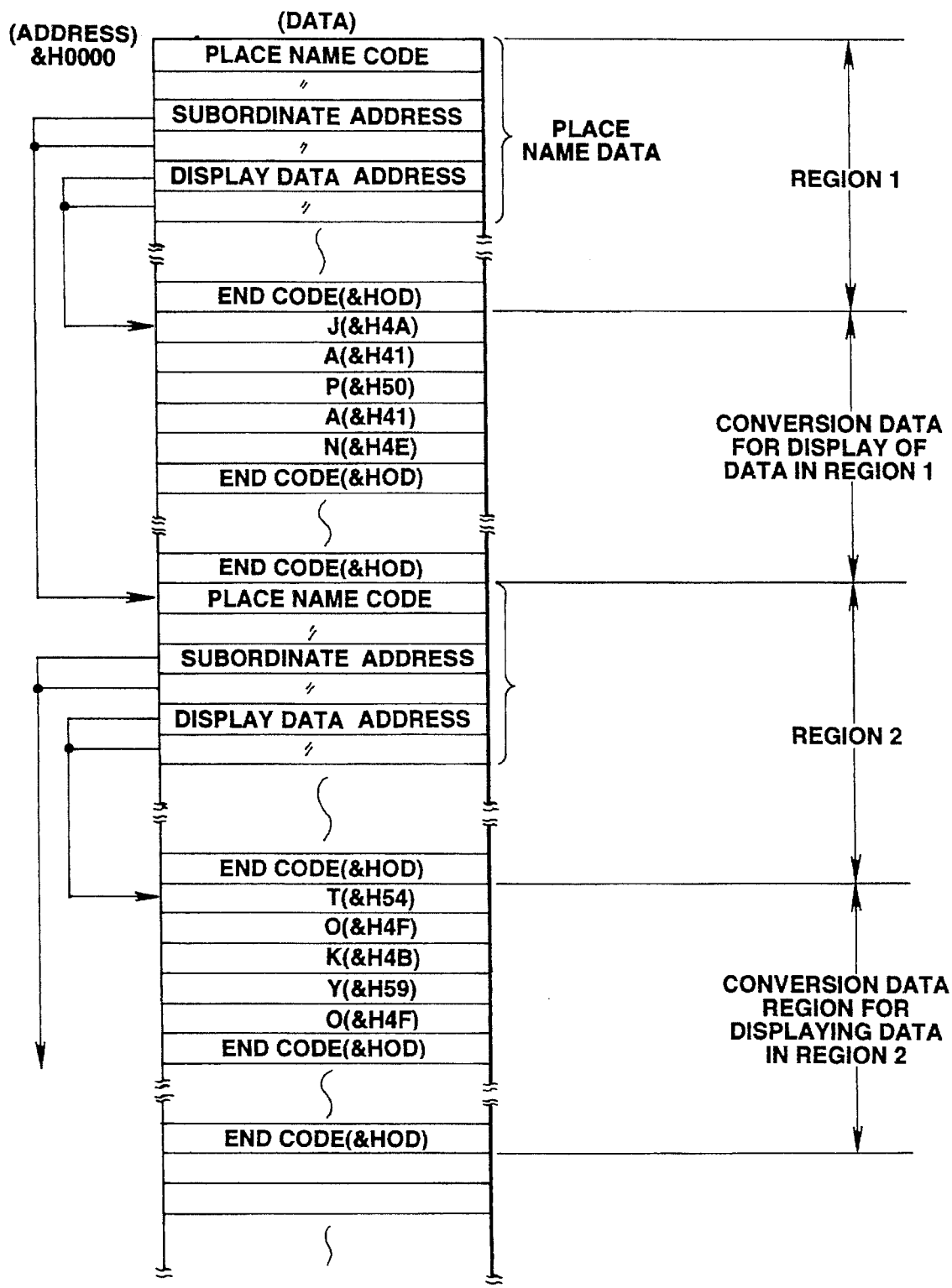
FIG. 16 is a memory map of place-name data in the camera in FIG. 8.
Figure 17:
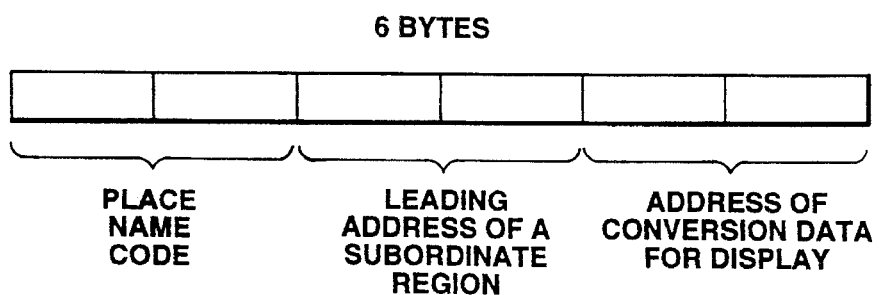
FIG. 17 shows a format of place-name data for the camera in FIG. 8.

FIG. 16 shows the memory map of place-name data. The place-name data are, as mentioned above, supposed to be stored in the form of a hierarchical structure. FIG. 17 shows a format of place-name data to be stored in the memory 72.

Each place-name data consists of, as shown in FIG. 17, six bytes in this embodiment. Two high-order bytes of place-name data represent place-name code data of specified hierarchical levels associated with one place-name. The place-name of the highest hierarchical level or the first hierarchical level specified in one of the place-name codes represents a nation name in this embodiment. The place-name specified in the data of the lower level or the second level represents a district name subordinate to a nation name. The place-name specified in the data of the lower level or the third level represents an urban or rural prefecture name. Subordinate place-names are registered in the lower-level segments, if necessary. These place-name codes are written in the two high-order bytes in the order of hierarchical levels.

Two lower-order bytes of place-name data in FIG. 17 provide leading addresses of subordinate regions in which the place-name codes of place-names in the lower-level segments subordinate to higher-level segments are stored. As for a place-name code of a lower level, when a higher level is the first level or the highest level, since the place-name of the first level represents a nation, the place-name code of a lower level represents a district which is subordinate to a nation. More particularly, if the nation is Japan, the district subordinate to the nation "Japan" is Tokyo, Chiba, Osaka, or other urban or rural prefecture name. The code of Tokyo, Chiba, Osaka, or the like is provided as the place-name code of the second level. The data values in the two lower-order bytes serve as addresses in the memory at which the place-name data of the second level are stored.

Two low-order bytes of place-name data in FIG. 17 provide leading addresses in the memory map at which the conversion data for display of place-names associated with place-name codes are stored. The leading address is a memory address, wherein assuming that a first-level place name is Japan, when JAPAN is displayed as the display form for allowing a use to recognize Japan, an ASCII code representing the leading character J of the data of the character string for display is stored at the leading address. The ASCII code representing the data of the character string for display specified with the selected place-name code is written in the memory circuit 18 that stores film recording data, and is recorded in the magnetic recording area on film. The recording of an ASCII code is interlocked with film winding.

Place-name data each of which represents a first-level place-name and consists of six bytes, are written in a region 1 in the memory map in FIG. 16 in units of six bytes. At the last address of the region 1, an end code &HOD (&H indicates that the displayed value is a hexadecimal number) is recorded. The code data based on an ASCII code table, which consists of display forms for place-names corresponding to first-level place-name codes, for example, &H4A, &H41, &H50, &H41, and &H4E of JAPAN for Japan, are stored in a storage region that ranks lower than the region 1 and stores display conversion data for the data in the region 1. At the next address, an end code &HOD for distinguishing from the next code data is stored.

Place-name data of second-level place-names subordinate to first-level place-names including place-name codes, for example, Tokyo, Chiba, Osaka, etc. for Japan are, as shown in FIG. 16, stored in a region 2 or a subordinate region in units of six bytes. The data structure of second-level place-names is identical to the one shown in FIG. 17. The place-name display codes for the place-names represented with the second-level place-name codes are stored in a display conversion data region that ranks lower than the region 2. For example, when a second-level place-name is Tokyo, ASCII codes representing the display characters TOKYO are stored.

Place-names of place-name codes, which are subordinate to the second-level place-names and of a lower level, are stored in a region 3 which is not shown in FIG. 16. For example, when a second-level place-name is Tokyo, the data of place-names subordinate to the place-name; Shinagawa-ku, Hachioji-shi, Okutama-mura, etc. are stored in the region 3.

The hierarchy of place-name data mentioned above proceeds until an end code is recorded next to a place-name code of place-name data. The depth of the hierarchy depends on a syntax for a place-name adopted in each nation, which will therefore not be standardized. In terms of a storage capacity, a deeper hierarchy is not necessarily advantageous.

Based on the aforesaid data structure of place-name data and the memory maps in the memories 29 and 72, the select switch in FIG. 9 is pressed to fetch a display conversion code into the memory circuit 18 used for magnetic recording. Input Place-Name will then be described in conjunction with the flowchart of FIG. 15.

At a step S100, a value &H0000 is set in a register ADRS1. The register ADRS1 specifies an address of a memory that stores place-name data. At a step S102, a value ADX is set in a register ADRS2. The register ADRS2 specifies an address of the memory circuit 18 that stores data to be recorded in the magnetic recording area of film. The value ADX represents an address associated with a film frame number. At a step S104, character code data is supplied to the display circuit 16 so that characters based on the place-name code will be displayed. With the output signal of the display circuit 16, the characters are displayed on the LCD 16a (See FIG. 9) according to the ASCII code table.

At a step S106, the states of four operation switches are input. At a step S108, the state of the UP select switch 73a is determined. If the switch 73a is on, control is passed to a step S110. If the switch 73a is off, control is passed to a step S120. At the step S110, the address value in the register ADRS1 is incremented by &H6. This processing is needed because the place-name data is 6 bytes long. At a step S112, it is determined whether the register ADRS1 specifies the last address of a region. As previously described, an end code is contained at the last address of each region. In the above determination, the presence of the end code is checked. If the last address is specified, the leading address of the region is set in the ADRS1 at a step S114. Control is then returned to the step S104. If the last address is not specified, control is passed to the step S104. Every time the UP switch 73a is turned on, addresses change from the higher level to the lower level. The display of a place-name changes accordingly.

After it is determined that the UP switch 73a is off, when control is passed from the step S108 to S120, the state of the DOWN select switch 73b is determined. If the DOWN switch 73b is on, control is passed to a step S122. If the switch 73b is off, control is passed to a step S130. When control is passed to the step S122, the operations of steps S122, S124, and S126 are carried out. Consequently, every time the DOWN switch 73b is turned on, addresses of place name data change from the lower level to the next higher level. Interlocked with the change of addresses, the display of a place-name changes. Using the UP switch 73a and DOWN switch 73b constituting the select switch 73, a user can search for an intended place-name.

When the DOWN switch 73b is off, if control is passed from the step S120 to S130, the state of the SET select switch 73c is determined. If the SET switch 73c is on, control is passed to a step S132. If the SET switch 73c is off, control is passed to a step S140. At the step S132, a place-name code specified in the register ADRS1 is written in the memory circuit 18 that stores data to be recorded in the magnetic recording area on film. An address of the memory circuit 18 is specified with the data in the register ADRS2.

Control is then passed to a step S134. A value &H2 is added to the value in the register ADRS2, which modifies the address value. At a step S136, the leading address of a subordinate region is set in the ADRS1. This setting enables retrieval of a place-name subordinate to the place name determined at the step S132. Control is then passed to a step S138. It is then determined whether an end code is included in the Input place-name data specified in the ADRS1. If the end code is found, retrieval of a place-name is disabled. The routine Input Place-Name is terminated. If the end code is not found, control is returned to the step S104.

After it is determined that the SET switch 73c is off, when control is passed from the step S130 to S140, the state of the END select switch 73d is determined. When the END switch 73d is off, control is returned to the step S104. When the END switch 73d is turned on, the routine Input Place-Name is terminated. When it is required to terminate input of a place-name, the END switch 73d is pressed. For example, when the input of a place-name code that is more particular than the one currently designated is unnecessary, after a necessary code is entered, the END switch 73d is turned on. Otherwise, the input operation continues until the hierarchical structure of place-name data comes to an end.

As described above, according to the camera of the present invention, the select switch 73 is used to select a place-name code at every photography of one frame, and the code is stored in association with a film frame number. During film wind, place-name display codes can be recorded in the magnetic recording area in association with film frames. During printing, the place-name display codes are read out, and characters or graphics indicated with the codes are superimposed on the prints of associated film frames. According to the camera of this embodiment, a position information detector such as a special receiver for receiving photographic position data provided by the GPS or the like need not be incorporated in the camera. Nevertheless, wherever a photographic place is; indoor or in a basement, for example, a place-name code related to photography can be recorded as position information on film.

In the camera of the aforesaid embodiment, photographic position data is magnetically recorded on film. A means for recording photographic position data may be an electronic storage procedure for writing data in a memory means such as an EEPROM installed in a Patrone.

In the aforesaid embodiment, place-names are superimposed on prints during printing. It is also possible to superimpose characters or graphics indicated with display codes on prints during film developing.

In this embodiment, position data is magnetically recorded at each photography of one frame. In a camera that can be proposed as a variant, place-name data are stored in association with frames in a memory circuit, and during film rewind performed after photography of the entire roll of film terminates, characters or graphics based on the place-name data are magnetically recorded in associated frames.

In this embodiment, place-name Information is recorded as recording information. In a camera that can be proposed as a variant, not only place-name Information but also other information related to photography are stored in the form of a hierarchical structure In a memory means, and information selected when needed is recorded on film.

Next, a camera system comprising the camera of the second embodiment and an image printer will be described as the third embodiment of the present invention. A camera constituting this system has the same components as that of the second embodiment has. The image printer prints images photographed by the camera. When printing the images, the image printer superimposes place-name information magnetically recorded on film on the prints on photographic paper.

Figure 18:
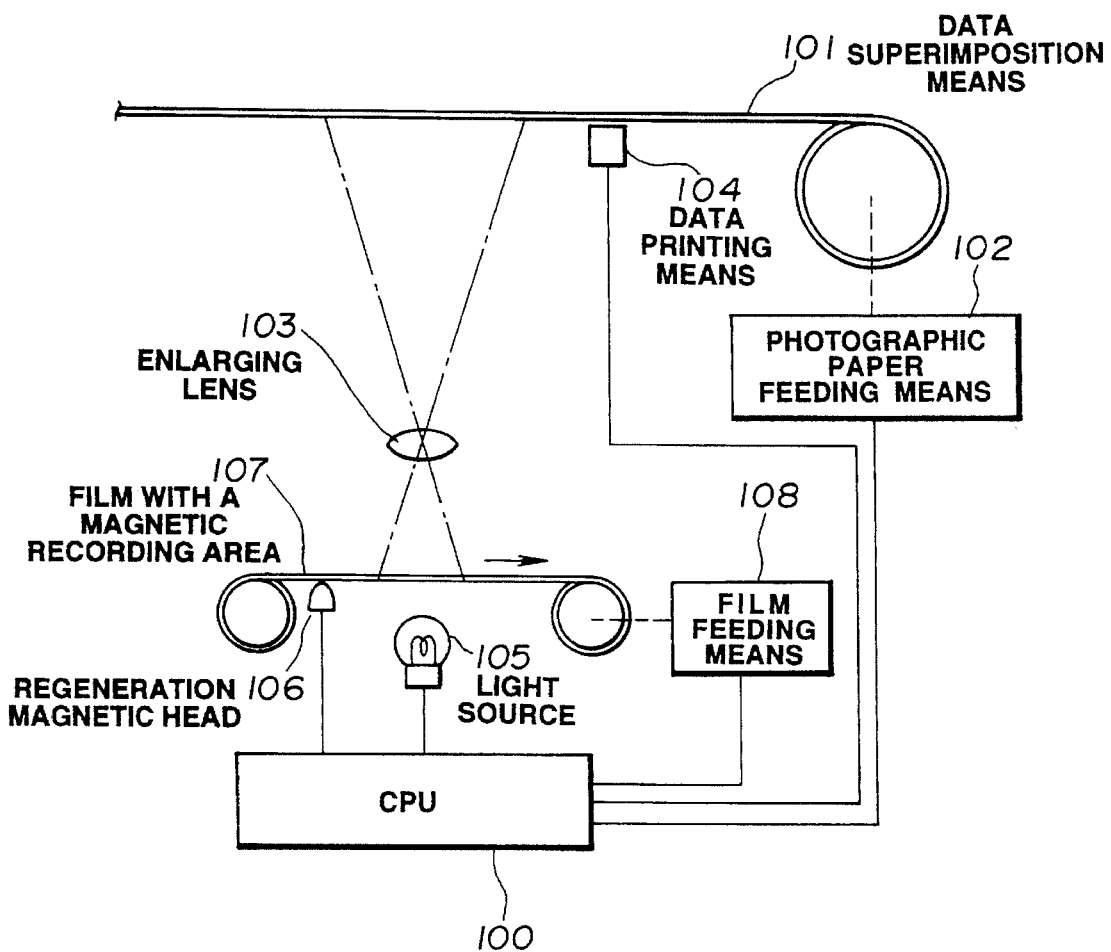
FIG. 18 is a block diagram showing a print system that superimposes magnetically-recorded place-name information on images on film by the camera in FIG. 8.

FIG. 18 is a block diagram of the above image printer. This system comprises a CPU 100 serving as a sequence control means, a photographic paper feeding means 102, an enlarging lens 103, a data superimposition (printing) means 104 formed with a light-emitting diode array, a light source 105 for illuminating images, a magnetic head 106 for regenerating magnetically-recorded data, and a film feeding means 108. In FIG. 18, reference numeral 101 denotes photographic paper and reference numeral 107 denotes exposed and recorded film.

Figure 19:
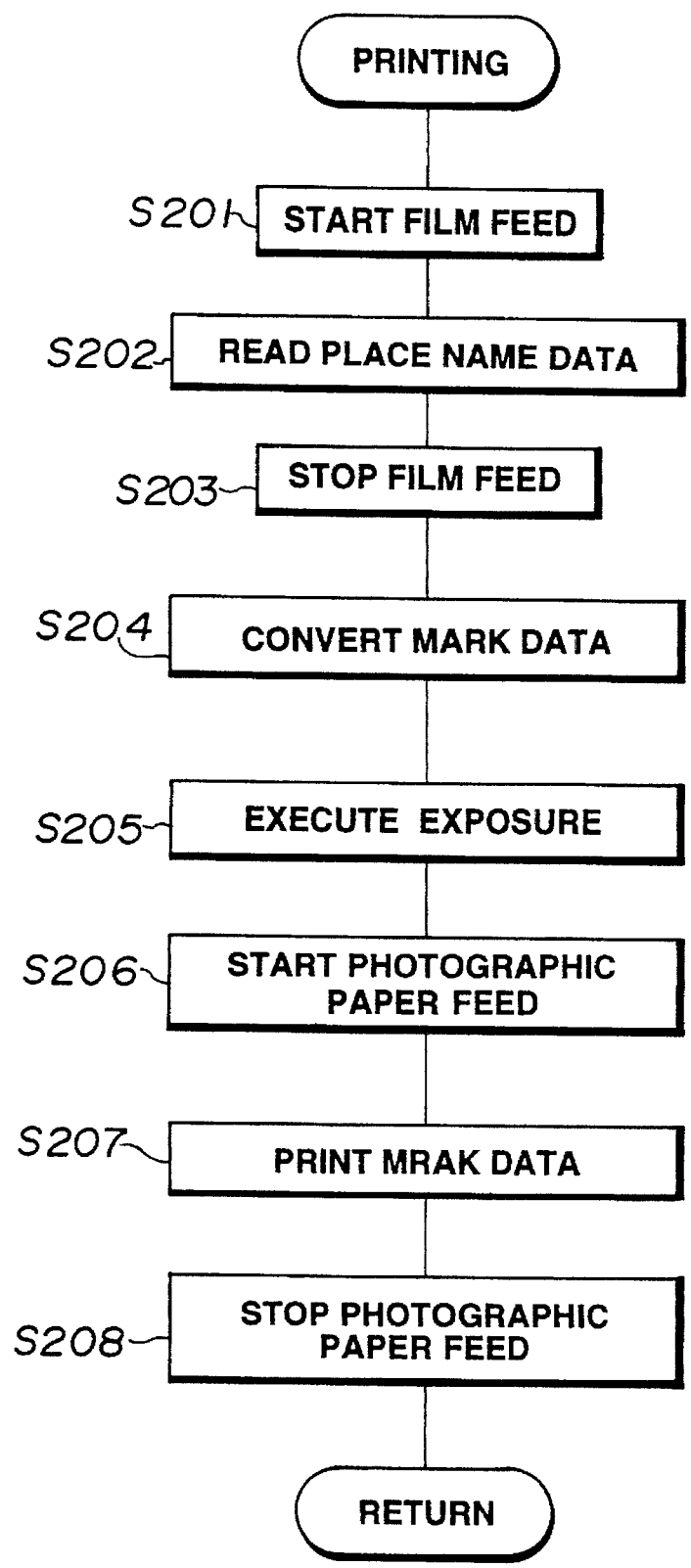
FIG. 19 is a flowchart of printing performed by the print system in FIG. 18.
Figure 20:
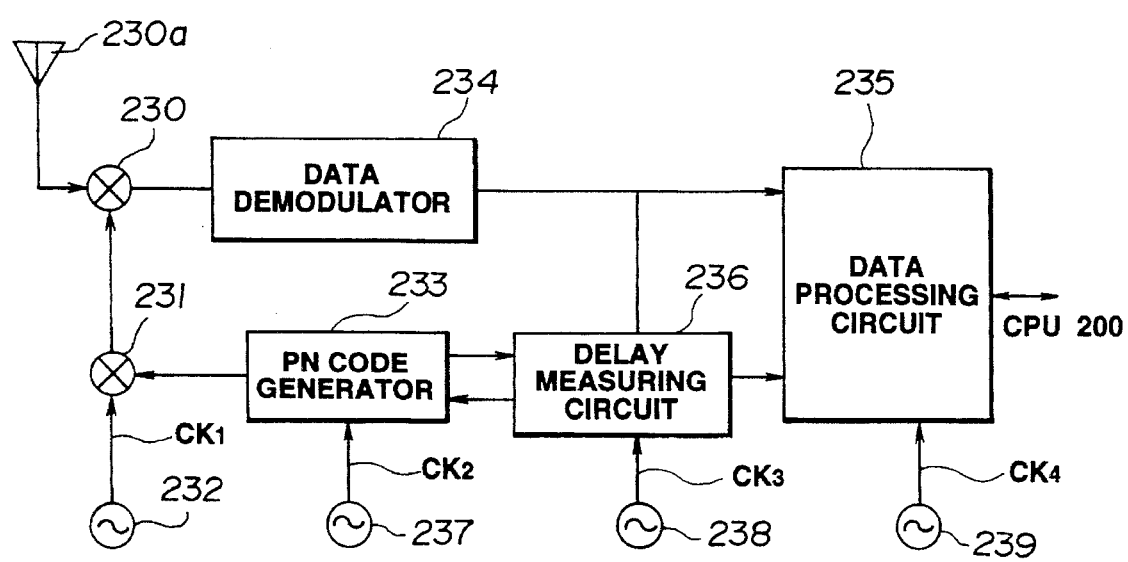
FIG. 20 is a block diagram of a GPS receiver employed for a conventional GPS.

FIG. 19 is a flowchart of printing in the foregoing image printer. In this printing, first, the film feeding means feeds film (step S201). During the feeding, place name data is read from the magnetic recording area of the film 107 using the regeneration magnetic head 106 (step S202). After feeding for one frame terminates, film feeding is stopped (step S203).

The read place-name data is converted into mark data (step S204). The image on the film 107 is exposed with the light originating from the light source 105 via the enlarging lens 103, and then transferred to the photographic paper 101 (step S205). After the exposure terminates, the photographic paper feeding means 102 feeds the photographic paper 101. During the feeding, the data superimposition means superimposes the mark data on the print in the photographic paper 101 (step S207). When the feeding for one frame of the photographic paper 101 terminates, feeding the photographic paper 101 is stopped. Printing for one frame then terminates.

Alternatively, the place-name data may be converted into character codes during the conversion of the step S204, and then characters based on the character codes may be superimposed at the step S207.

What is claimed is:

1. A camera using film with a recording area, comprising:
    a position measurement means that receives position measurement data indicating a photographic setting location and performs position measurement to determine the photographic position;
    a position measurement data memory means for storing position measurement data;
    a determining means for determining whether said position measurement means can receive position measurement data;
    a position measurement data recording means for recording position measurement data in said film recording area; and
    a recording control means for storing position measurement data in said position measurement data memory means and allowing said position measurement data recording means to record position measurement data in said film recording area when said determining means determines that said position measurement means can receive position measurement data, and, for reading previously-stored position measurement data from said position measurement data memory means and allowing said position measurement data recording means to record position measurement data in said film recording area when said determining means determines that said position measurement means cannot receive position measurement data.

2. A camera according to claim 1, wherein said position measurement means determines position measurement data responsive to a photographing operation.

3. A camera according to claim 1, wherein said recording area of film is a magnetic recording area, and said position measurement data recording means comprises a magnetic head.

4. A camera using film with a magnetic recording area, comprising:
    a position measurement means for receiving position measurement data indicating a photographic setting location responsive to a photographing operation and performs position measurement to determine a photographic position;
    a determining means for determining whether said position measurement means can receive position measurement data;
    a position measurement data memory means for storing data resulting from position measurement when said determining means determines that said position measurement means can receive position measurement data;
    a position measurement data recording means for recording data resulting from position measurement in a portion of said film magnetic recording area associated with a photographed image when said determining means determines that said position measurement means can receive position measurement data; and
    a recording control means for reading previously-stored position measurement data from said position measurement data memory means and allows said position measurement data recording means to record position measurement data in said film magnetic recording area when said determining means determines that said position measurement means cannot receive position measurement date.

5. A camera according to claim 4, wherein said position measurement data recording means performs recording responsive to a photographing operation of one frame.

6. A camera according to claim 4, wherein said position measurement data recording means performs recording during a film rewind operation.

7. A camera using film with a recording area in which information is recorded, comprising:
    a position measurement means for receiving a position measurement signal transmitted from a location remote from said camera and detecting position information relating to a photographic setting location of said camera using the position measurement signal;
    a memory means for repeatedly storing said position information provided by said position measurement means;
    a determining means for determining whether said position measurement means can detect said position information;
    a control means for updating position information in said memory means with newly-detected position information when said determining means determines that said position information can be detected, and for inhibiting update of said position information when said determining means determines that said position information cannot be detected; and
    a recording means that records data in said film recording area according to position information recorded in said memory means.

8. A camera according to claim 7, wherein said recording area of said film used for said camera is a magnetic recording area; and said recording means magnetically records said data in said recording area.

9. A camera according to claim 7, wherein said position measurement means includes a global positioning system (GPS) receiver.

10. A camera according to claim 7, further comprising a transport means for transporting a film after photographic operation performed on said film terminates; said recording means recording said data during the transport of said film.

11. A camera using film with a recording area in which information is recorded, comprising:

a first signal generation means for outputting a pre-photographic operation start signal;

a position measurement means for detecting position information relating to a photographic setting location of said camera using a position measurement signal sent from a location remote from said camera responsive to any output of said first signal generation means;

a memory means for storing said position information provided by said position measurement means;

a determining means for determining whether said position measurement means can detect said position information a memory control means for updating position information and stores updated position information in said memory means when said determining means determines that said position information can be detected, and for inhibiting updating of position information and storage of updated position information in said memory means when said determining means determines that said position information cannot be detected;

a second signal generation means for outputting a photographic operation start signal;

an exposure control means for performing a photographic operation on said film responsive to an output of said second signal generation means;

a film transport means for transporting said film after said photographic operation terminates; and a recording means for recording data in said film recording area according to the position information recorded in said memory means while said film transport means is transporting said film.

12. A camera according to claim 11, wherein said recording area of said film used for said camera is a magnetic recording area; and said recording means magnetically records said data in said recording area.

13. A camera according to claim 11, wherein said position measurement means includes a global positioning system (GPS) receiver.

14. A camera using film with a recording area in which information is recorded, comprising:

a detection means for detecting position information relating to a photographic setting location of said camera using a position measurement signal sent from a location remote from said camera;

a memory means for storing said position information;

an output means for outputting said position information detected by said detection means when said detection means has properly detected said position information, and for outputting previous position information stored in said memory means when said detection means has not properly detected said position information; and a recording means for recording data in said recording area of film according to said position information provided by said output means.

15. A camera according to claim 14, wherein said recording area of said film used for said camera is a magnetic recording area; and said recording means magnetically records said data in said recording area.

16. A camera according to claim 14, wherein said position measurement means includes a global positioning system (GPS) receiver.

17. A camera capable of detecting position information, comprising:

a position measurement means for detecting position information relating to a photographic setting location of said camera on Earth using a position measurement signal sent from a location remote from said camera;

a memory means for repeatedly storing position information sent from said position measurement means;

a determining means for determining whether said position measurement means can detect said position information; and a control means for updating position information stored in said memory means with newly-detected position information when said determining means determines that said position information can be detected, and for inhibiting update of said position information when said determining means determines that said position information cannot be detected to retain the position information stored prior to inhibiting an update.

18. A camera according to claim 17, wherein said position measurement means includes a global positioning system (GPS) receiver.

19. A camera capable of recording photographic information in a recording area provided in a Patrone, comprising:

a position measurement means for receiving position measurement data indicating a photographic setting location responsive to a photographing operation and performing a position measurement to determine said photographic position;

a determining means for determining whether said position measurement means can receive position measurement data;

a position measurement data memory means for storing data resulting from position measurement when said determining means determines that said position measurement means can receive position measurement data;

a position measurement data recording means for recording data in a recording area of said Patrone; and a recording control means for recording data resulting from position measurement in association with an image when said determining means determines that said position measurement means can receive position measurement data, and for recording previously-stored position measurement data when said determining means determines that said position measurement means cannot receive position measurement data.

20. A method for operating a camera comprising the steps of:

(a) deriving position information relating to a photographic setting location of said camera from a location remote from said camera responsive to a present position information request;

(b) storing the received position information in a memory;

(c) performing a photographing operation and creating an image on a frame of said film;

(d) recording position information data stored in said memory and derived during step (a) in an area of a film provided for recording such data when the position information is received properly; and (e) recording information stored in said memory during a position information request prior to the present position information request in said film recording area when position information is not properly received.

* * * * *